United States Patent Office 2,772,960
Patented Dec. 4, 1956

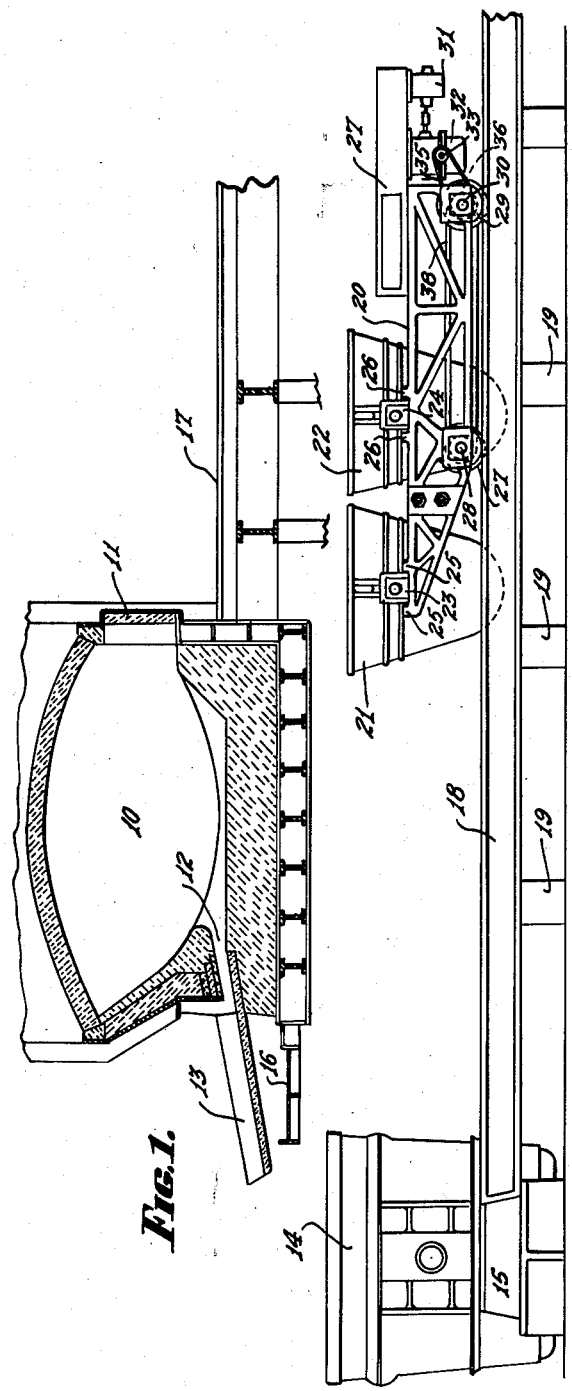

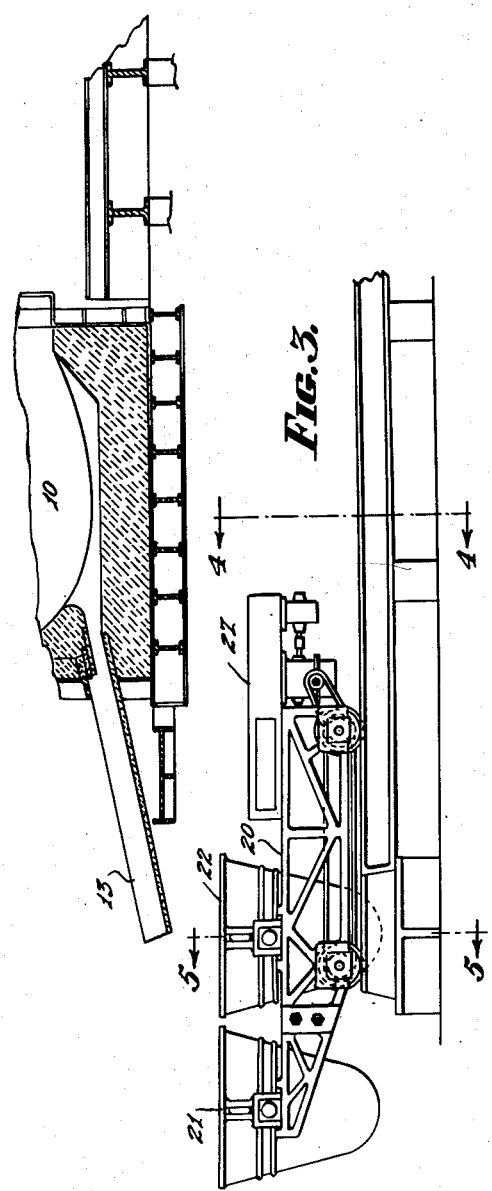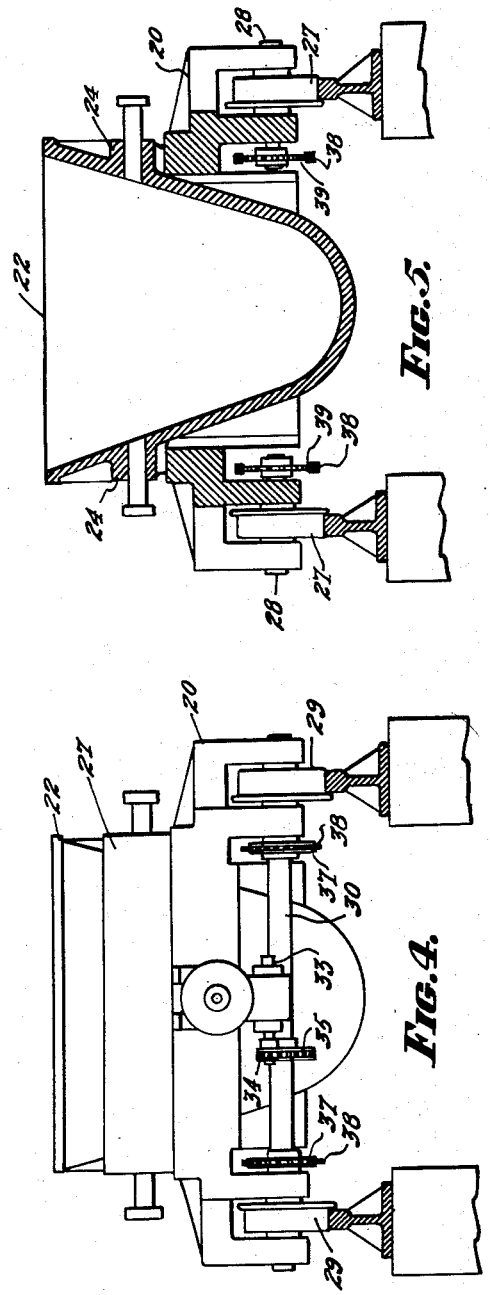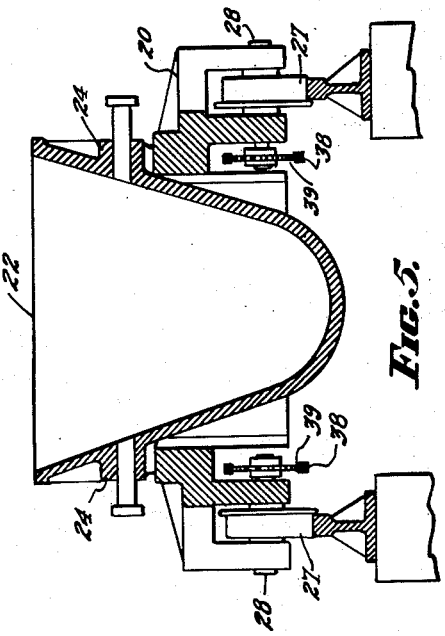

2,772,960
SLAG CAR FOR OPEN HEARTH FURNACES

George H. Todd, Ashland, Ky., and Hugh C. Barnes, Franklin, Ohio, assignors to Armco Steel Corporation, Middletown, Ohio, a corporation of Ohio Application August 11, 1955, Serial No. 527,675

10 Claims. (Cl. 75—43)

This invention relates to a slag car for use with open hearth furnaces. In the conventional furnace a slag car is used upon which a slag pot is supported. The car is moved to a position with the slag pot under the charging side of the open hearth furnace to receive the slag resulting from the flushing operation. In open hearth practice, after the charge has been well melted about six hours before the furnace is to be tapped, hot metal is added to the charge and results in a violent reaction between the metal and the ore, causing the slag resulting from the reaction to be flushed out of the furnace. This slag is highly effervescent and it generally boils over and considerable quantities of it spill out of the slag pot onto the open hearth floor. In an effort to avoid this accumulation of slag on the floor under the furnace, various expedients have been employed. In some shops the percentage of hot metal and ore charged has been reduced so as to conform to the slag handling capacity; but this is contrary to an optimum productive rate and to the production of lowest cost ingots. In other shops, attempts have been made to solve the problem by the installation of both front and back flushing. This has been costly and has met with only fair success. In still other shops a slag car and pot are not used at all and the slag is simply flushed upon the ground. After it has been cooled with water, bulldozers are used to scrape the slag from beneath the furnace toward the pit. Other attempts to design a single pot of sufficient capacity, as for example an elliptical pot, have been found to be excessively expensive both to the pots themselves and in the redsigned equipment necessary to transport the slag from the bath to a dump.

With the foregoing considerations in view, it is an object of the present invention to provide a slag car having adequate capacity to take care of the highly effervescent slag resulting from the flushing operation without great expense. It is another object of the invention to provide an arrangement whereby the spilling of slag upon the floor with the consequent requirement for bulldozing is avoided.

These and other objects of the invention which will be discussed in greater detail hereinafter or which will be apparent to one skilled in the art upon reading these specifications we accomplish by that construction and arrangement of parts of which we shall now describe an exemplary embodiment.

Reference is made to the drawings forming a part hereof and in which:

Figure 1 is a cross-sectional view through an open hearth furnace showing an elevational view of the slag car in its relation to the furnace.

Figure 2 is a fragmentary view similar to Figure 1, showing the slag car in position to receive drippings from the tap hole.

Figure 3 is a fragmentary view similar to Figure 2 showing the slag car in position for removal of the slag pots by the pit crane after completion of the heat.

Figure 4 is a cross-sectional view on an enlarged scale taken on the line 4—4 of Figure 3.

Figure 5 is a view similar to Figure 4 taken on the line 5—5 of Figure 3.

Briefly, in the practice of the invention, we provide a two-pot slag car of cantilevered construction, properly counterweighted, and driven by a motor mounted thereon with the controls suitably located. The car runs on tracks beneath the furnace which form an extension in effect of the hot metal ladle stand.

Referring now in more detail to the drawings, a conventional open hearth furnace is shown at 10 having a charging door at 11 and a tap hole at 12. During the tapping operation, the hot metal flows from the tap hole down a runner 13 and is received in the ladle 14 which rests upon the hot metal ladle stand 15. A platform 16 is provided adjacent the runner 13 in conventional manner and on the charging side there is the usual charging floor 17. During the flushing operation, hot metal is introduced through a charging door and the slag is flushed out through a suitable orifice (not shown) at the front of the furnace.

According to our invention, the slag car runs on tracks 18 beneath the furnace, which tracks are supported upon piers 19. The tracks 18 form a continuation of the ladle stand 15, so that after the hot metal ladle has been removed, the slag car may be run along the rails 18 with one pair of wheels running onto the ladle stand 15.

The slag car comprises a cantilevered frame construction indicated generally at 20 and carries two slag pots 21 and 22. The bosses 23, 24 of the slag pots rest upon the frame 20 and are locked by the abutments 25, 26. A suitable counterweight is provided at 27.

In the preferred embodiment, the car is provided with two pairs of wheels. The wheels 27 are double-bearing wheels (as best seen in Figure 5) mounted on stub axles 28 so as to leave room in the frame between the wheels 27 for the slag pot 22. The wheels 29 are single bearing wheels mounted on a through-axle 30 (as best seen in Figure 4). A driving motor 31 and worm gear reducer 32 are provided to drive the car. Power will be fed to the motor 31 by a reel and cable (not shown) with the controls suitably located.

The output shaft 33 of the speed reducer carries a sprocket 34 and a chain 35 connects the sprocket 34 with a sprocket 36 on the shaft 30, thus transmitting the drive to the wheels 29. The shaft 30 carries the sprockets 37 which by means of chains 38 drive the sprockets 39 on the stub axles 28. In this way the drive is transmitted also to the wheels 27.

It will be observed that the pot 22 is supported on the frame 20 inboard with respect to the wheels but adjacent the wheels 27. The pot 21 is supported outboard with respect to the wheels on the cantilever extension of the frame 20. The counterweight 27 together with the motor 31 and gear reducer 32 are mounted outboard with respect to the wheels at the other end of the frame 20. By virtue of this arrangement, the car will remain in substantial balance on its wheels without regard to whether neither of the pots is in position or both of the pots or either one of the pots.

In practice, after the charge is well melted and generally some six hours before tapping, hot metal is added to the charge to produce flushing off of the slag. The slag car will initially be in the position shown in Figure 1 and the flushed off slag will be received in the pot 21. This slag is highly effervescent and as soon as the effervescence approaches the brim of the pot 21, the car is moved over to a position in which the pot 22 occupies the position of the pot 21 in Figure 1 and further flushed off slag is now received in the pot 22.

While slag is being received in the pot 22, the effervescence in the pot 21 gradually subsides and when the effervescence in the pot 22 approaches the brim, the car is moved back to the position of Figure 1 and additional slag is received in the pot 21 while the effervescence in the pot 22 is in turn permitted to subside. This back and forth shifting may be carried on until the flushing operation is complete.

We found that in a furnace having a capacity of 250 to 300 tons per heat, and using two pots of 400 cubic foot capacity on sixty percent hot metal practice, these pots will each be approximately ¾ full when the flushing operation is completed. In other words, we have found it desirable that each pot should have a capacity approximately ⅔ of the total slag volume expected. In this way spilling over of slag upon the floor is substantially completely eliminated.

After the tapping operation has been completed and the hot metal ladle 14 is removed by the pit crane, the slag car may be moved to the position of Figure 2, so that the slag pot 21 may catch the drippings from the tap hole. When all the drippings have been caught (and if the pot 21 is filled to capacity, the pot 22 may be brought into position as shown in Figure 3) and when the runner 13 is removed, the pots 21 and 22 may be removed by the pit crane.

It will be understood that numerous modifications may be made without departing from the spirit of our invention and we, therefore, do not intend to limit ourselves otherwise than as set forth in the claims which follow.

Having now fully described our invention, what we claim as new and desire to secure by Letters Patent is:

1. The method of handling the effervescent slag resulting from the flushing of an open hearth furnace, which includes the steps of receiving the flushed off slag alternately in two slag pots, changing from one slag pot to the other before the level of the effervescent slag in such pot reaches the brim of such pot, and permitting the slag in the one, partially filled pot, to subside.

2. The method of handling the effervescent slag resulting from the flushing of an open hearth furnace, which includes the steps of receiving the flushed off slag initially in one slag pot until the effervescence therein approaches the brim of said pot, then substituting a second slag pot and receiving further flushed off slag therein while permitting the slag in said first pot to subside, until the effervescence in said second pot approaches the brim, then resubstituting said first slag pot and receiving therein additional flushed off slag while permitting the slag in said second pot to subside, until the effervescence in said first pot again approaches the brim, and then resubstituting said second slag pot to receive therein the remainder of said slag.

3. A slag car for open hearth furnaces, comprising a cantilevered frame, two pairs of wheels for said frame adapted to ride on rails, one pair of wheels being mounted on a single axle, the other pair being individually mounted on stub axles whereby to leave said frame open therebetween, a support for a slag pot between said pairs of wheels adjacent said individually mounted wheels, a second support for a second slag pot on said frame beyond said individually mounted wheels, and a counterbalance weight on said frame beyond said single axle whereby said car will rest on its four wheels with either or both of said slag pots in position.

4. A slag car according to claim 3, wherein said two pots are of substantially equal size, each having a capacity of about ⅔ the total amount of slag to be flushed from the furnace.

5. A slag car according to claim 3, wherein an electric motor and gear reducer are mounted on said car, operative transmission means between said gear reducer and said single axle, and operative transmission means from said single axle to each of said stub axles, whereby all four wheels of said car may be driven.

6. A slag car for open hearth furnaces, comprising a wheeled structure having motive means whereby it is adapted to run on rails beneath an open hearth furnace, means inboard with respect to said wheels for supporting a slag pot, means outboard with respect to said wheels at one end of said car for supporting a second slag plot, and counterbalancing means outboard with respect to said wheels at the other end of said car, whereby said car will rest on its wheels without regard to whether either, neither, or both of said slag pots are in position.

7. A slag car according to claim 6, wherein said two pots are of substantially equal size, each having capacity of about ⅔ of the total amount of slag to be flushed from the furnace.

8. A slag car according to claim 6, wherein means are provided to drive all the wheels of said car.

9. A slag disposal structure for open hearth furnaces wherein a ladle stand is provided at a level below the furnace on the tapping side thereof, and wherein there is a pit below the furnace and rails running under said furnace in said pit; comprising means to support said rails at an elevation and spacing corresponding to said ladle stand, said rails extending to said ladle stand, a wheeled structure having motive means and disposed to travel on said rails, and adapted by virtue of said elevation, spacing, and extent, to run out onto said ladle stand, means inboard with respect to said wheels for supporting a slag pot, means outboard with respect to said wheels at one end of said wheeled structure for supporting a second slag pot, and counterbalancing means outboard with respect to said wheeled structure, whereby said wheeled structure will rest on its wheels without regard to whether either, neither, or both of said slag pots are in position.

10. In an open hearth furnace having a pit therebeneath, rails disposed beneath said furnace in said pit and extending beyond the charging and tapping sides of said furnace, a ladle stand on the tapping side of said furnace, said ladle stand constituting an extension of said rails, a slag car adapted to run on said rails and on said ladle stand, said slag car comprising a wheeled structure having motive means whereby it is adapted to run on rails beneath said furnace, means inboard with respect to said wheels for supporting a slag pot, means outboard with respect to said wheels at one end of said wheeled structure for supporting a second slag pot, and counterbalancing means outboard with respect to said wheeled structure, whereby said wheeled structure will rest on its wheels without regard to whether either, neither, or both of said slag pots are in position.

References Cited in the file of this patent
UNITED STATES PATENTS 1,812,314    Astrom _____ June 30, 1931